United States Patent [19]

Pasch

[11] 4,005,783

[45] Feb. 1, 1977

[54] MULTI-CAVITY MOLD LOADING APPARATUS

[75] Inventor: Lambert M. Pasch, Aachen-Nutheim, Germany

[73] Assignee: Uniroyal Aktiengesselschaft, Aachen, Germany

[22] Filed: Dec. 1, 1975

[21] Appl. No.: 636,782

[30] Foreign Application Priority Data

Feb. 14, 1975 Germany .......................... 2506170

[52] U.S. Cl. .......................... 214/1 BB; 214/8.5 C; 214/301; 214/309; 214/658; 221/220; 294/87 R; 294/93

[51] Int. Cl.² ........................................ B65G 59/02

[58] Field of Search ................ 214/1 BB, 301, 309, 214/8.5 C, 658, 147 T, 151, DIG. 1; 221/220; 294/87 R, 93, 67 C, 90

[56] References Cited

UNITED STATES PATENTS

| 412,853 | 10/1889 | Keene | 294/87 R X |
|---|---|---|---|
| 3,144,148 | 8/1964 | Merkner | 294/93 X |

*Primary Examiner*—L. J. Paperner
*Assistant Examiner*—George F. Abraham
*Attorney, Agent, or Firm*—Philip Sands

[57] ABSTRACT

Apparatus for inserting a plurality of molding inserts into respective mold cavities of a multi-cavity mold, simultaneously, is disclosed. The apparatus comprises an insert-holding arrangement for removably holding a plurality of generally annular inserts in spaced apart relation corresponding to the relative spacing of a plurality of cavities of a multi-cavity mold, the insert-holding arrangement including resilient-like projection members for frictionally securing respective ones of the annular inserts from the interior of the latter. The apparatus furthermore includes an insert-stripping arrangement operatively associated with the projection members and the inserts for stripping the latter simultaneously from their associated projection members to effect the simultaneous insertion of the inserts into respective mold cavities of the multi-cavity mold.

10 Claims, 4 Drawing Figures

MULTI-CAVITY MOLD LOADING APPARATUS

BACKGROUND OF THE INVENTION

The present invention relates generally to the field of molding elastomeric articles, and more particularly to apparatus for loading the mold cavities of a multi-cavity mold with respective molding inserts, simultaneously.

Conventional molds often are provided with many cavities for curing elastomeric stock in the form of the cavities. The cavities often number as much as fifty cavities and sometimes considerably more. Associated with each of these cavities are various inserts for imparting to each of the cavities a preferred configuration or form into which elastomeric stock or compound is to be shaped and cured. As a result, each of the cavities must be loaded with respective ones of the inserts, and this is done conventionally by hand, one at at time.

The aforementioned hand-loading of the mold cavities with respective inserts is clearly a time consuming operation, and must be effected after each and every heat or molding cycle.

Another disadvantage associated with the hand-loading operation aforementioned is that the operator in charge of loading each of the cavities with inserts sometimes succumbs to human error and fails to load each and every cavity with a respective insert or with the proper insert. This results not only in the loss of one or more molded products in the course of a given heat or molding cycle, but it also results in the need to clean the insert-retainer plate of the mold after emptying the other properly cured molded products therefrom.

SUMMARY OF THE INVENTION

It is, therefore, an object of the present invention to obviate the above discussed disadvantages associated with the operation of molding elastomeric products.

More particularly, it is an object of the present invention to provide apparatus for loading a plurality of molding inserts into respective mold cavities of a multi-cavity mold, simultaneously.

It is a further object of the present invention to provide apparatus for insuring that each and every one of the mold cavities of a multi-cavity mold is properly loaded with a respective molding insert rapidly and effectively.

With the above and other objects in view, as will hereinafter be self-evident, the present invention may be characterized as apparatus for inserting a plurality of molding inserts into respective mold cavities of a multi-cavity mold, simultaneously. The apparatus comprises insert-holding means for removably holding a plurality of generally annular inserts in spaced apart relation corresponding to the relative spacing of a plurality of cavities of a multi-cavity mold, the insert-holding means including resilient projection means for frictionally securing respective ones of the annular inserts from the interior thereof; and insert-stripping means operatively associated with the projection means and inserts for stripping the latter simultaneously from their associated projection means to effect the simultaneous insertion of the inserts into respective mold cavities of the multi-cavity mold.

In a preferred form of the projection means, each of the latter includes a respective cantilevered spring for resiliently engaging the interior of an associated one of the inserts. Each projection means furthermore includes a respective slotted finger in which is movable a respective one of the aforementioned springs generally laterally of the direction the inserts are to be stripped therefrom, each spring extending at least in part outwardly of its associated slotted finger to engage the interior of a respective one of the inserts.

In the preferred form of the insert-stripping means, the latter includes a multi-apertured plate having apertures through which project respective ones of the fingers, the plate being movable relative to and along the fingers to strip the inserts from the fingers, simultaneously.

Each of the fingers can be moved in unison into an insert-storage assembly in which are disposed a plurality of insert-stacks in a spaced apart array corresponding to the relative spacing of the fingers. The springs associated with the fingers are so arranged that when the fingers are inserted into respective ones of the insert-stacks, the springs together with their associated fingers, act to frictionally grasp the interior of the uppermost one of the inserts of each of the stacks to withdraw the latter said uppermost inserts from the insert-storage assembly. The insert-holding means, and thus the fingers, are then movable to a different location at which is disposed the multi-cavity mold for purposes of loading the latter with the inserts, simultaneously.

BRIEF DESCRIPTION OF THE DRAWINGS

The above and additional objects and advantages of the instant invention will be more clearly understood from the following detailed description thereof when read in conjunction with the accompanying drawings, in which.

DETAILED DESCRIPTION OF THE INVENTION

Figure 1:
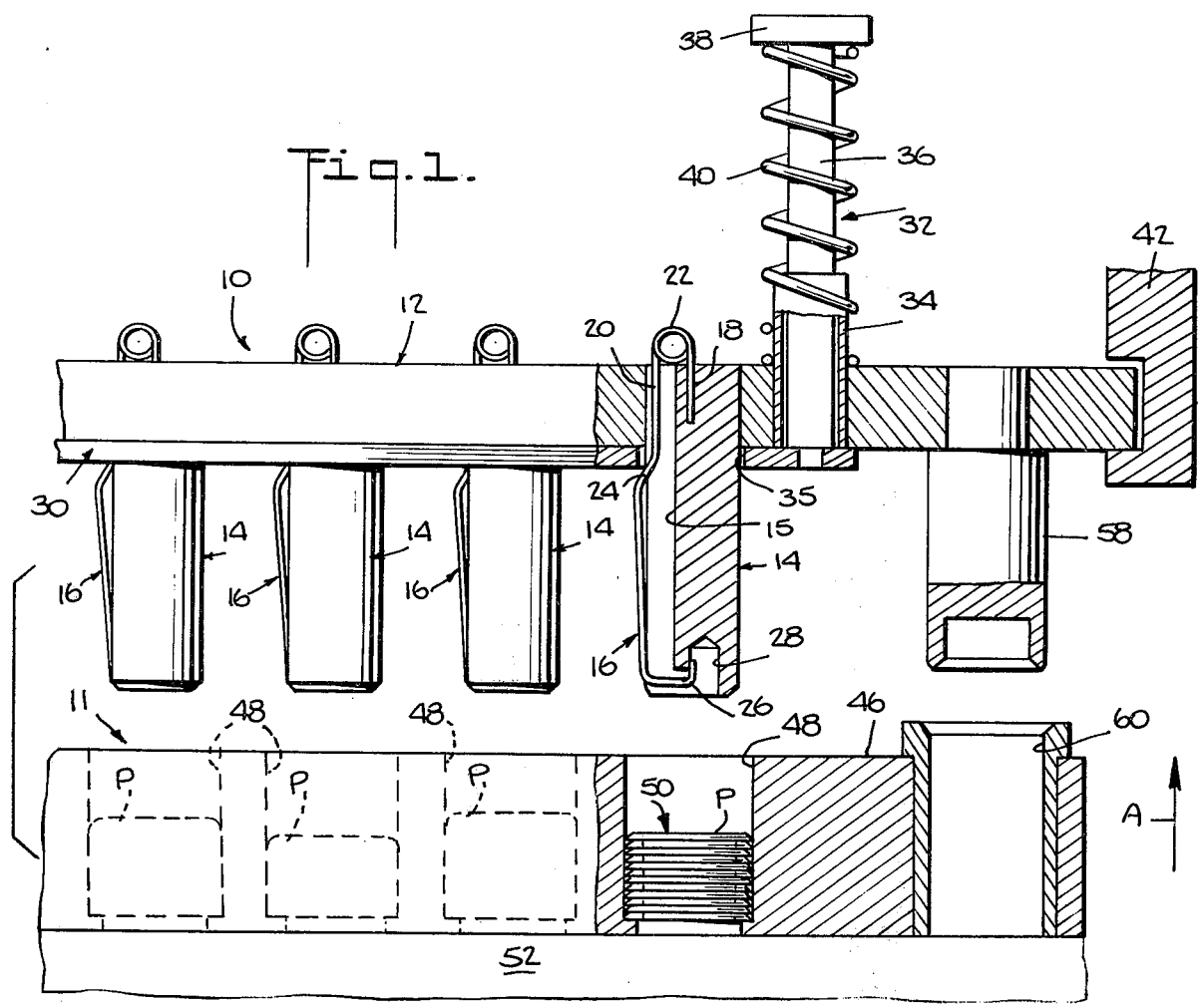
FIG. 1 is a fragmentary, partially vertical cross-sectional view of the insert-holding means and the insert-storage means in operative association with one another.

Referring now to the drawings, and more particularly to FIG. 1, there is illustrated in operative association with one another what may be characterized as an insert-holding means 10 and an insert-storage means 11. The insert-holding means 10 includes a plate 12 fixedly securing what may be characterized as resilient projection means 14. The projection means 14 are preferably in the form of slotted cylindrical fingers, but may be in the form, for example, of resilient, generally conical members, or otherwise pursuant to the concepts contemplated by the present invention.

Each of the fingers 14 is provided with a generally longitudinally extending slot 15 in which is confined, but out of which slightly projects, a respective spring 16. Each spring 16 is associated with its corresponding finger 14 in a generally cantilevered manner. The disposition of each spring 16 when in an at-rest condition is as illustrated in FIG. 1.

Each spring 16 includes a generally U-shaped upper region defined by a pair of limbs 18 and 20, and by a generally spiral transition region 22. Each limb 18 is anchored in the upper portion of its corresponding finger 14, whereas each limb 20 is movable in and biased outwardly of its associated slot 15 by its associated spiral transition region 22. Each limb 20 is longer than its associated limb 18, and is provided with a bent region 24 extending slightly laterally out of its corresponding slot 15. The lower portion of each spring 15 is provided with a generally hook-shaped region 26 which is movable within a recessed end portion 28 at the lower region of each finger 14 and restrained against unlimited lateral movement outwardly of its corresponding slot 15 by its corresponding recessed and portion 28.

It will be understood that each recessed end portion 28 of each of the fingers 14 is sufficiently laterally wide to enable its associated hook-shaped region 26 of each spring 16 to be moved over a sufficient lateral distance from its at-rest condition such that the bent region 24 of each spring 16 is fully within the confines of its corresponding slot 15 and generally concealed by the latter.

Associated with the insert-holding means 10 is an insert-stripping means 30 in the form of an apertured plate. Affixed to the apertured plate 30 are at least two (only one is shown) control units 32 for moving the plate 30 downwardly relative to the plate 12 and the fingers 14 of the insert-holding means 10. In this respect, the plate 30 is provided with a plurality of apertures 35 slightly larger in diameter than the diameter of each of the fingers 14, but less than the width defined by each of the fingers 14 on one side and each bent region 24 of each spring 16 on the other side. As a result, each aperture 35 of the plate 30 is capable of "camming" its corresponding bent region 24 of each spring 16 inwardly of the slots 15 of the fingers 14.

Each unit 32 for effecting movement of the plate 30 downwardly with respect to the fingers 14 includes a bushing or sleeve 34 affixed to and extending through an appropriate apertured portion in the plate 12. Extending loosely through each sleeve 34 is a rod-like member 36 affixed at one end to the plate 30 and having affixed to it at its opposite end a handle-like member 38. Surrounding the rod-like member 36 and the sleeve 34 is a generally helical compression spring 40 pressing at one end against the upper region of the plate 12 and at the other end against the handle-like member 38. The spring 40, thus, functions to separate the handle-like member 38 from the plate 12 and, thereby, resiliently maintain the plate 30 biased against the lower surface of the plate 12 and at the upper portion of each of the fingers 14.

Figure 3:
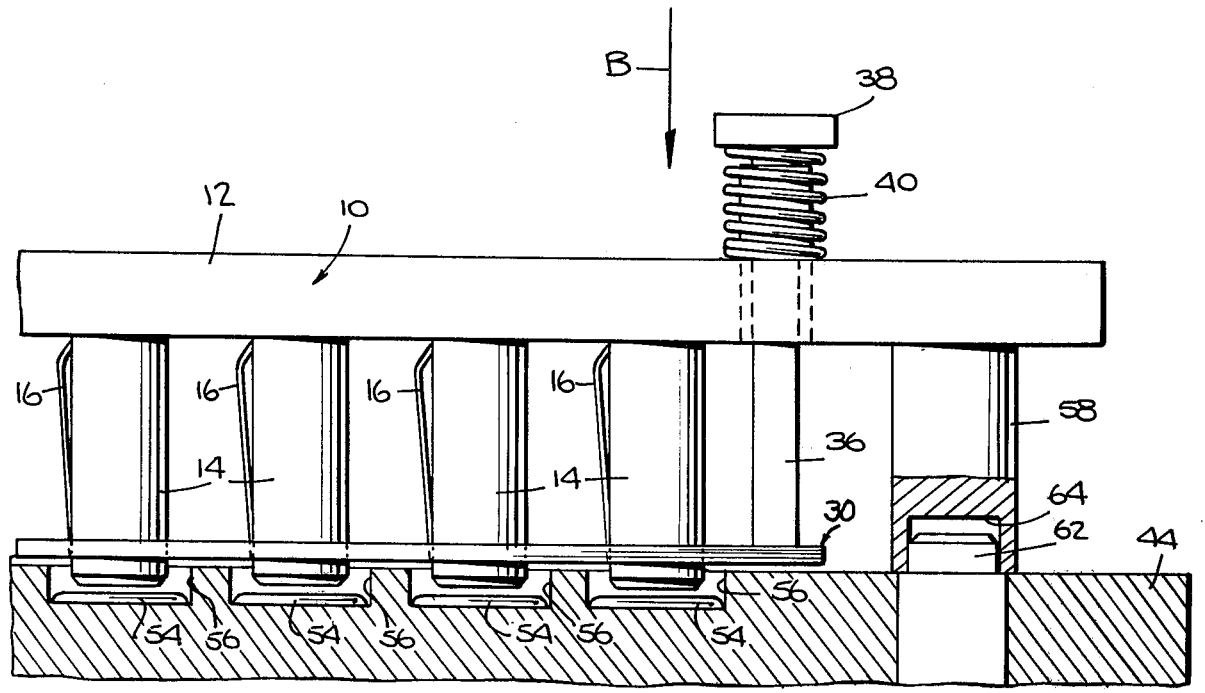
FIG. 3 is a fragmentary, partially vertical cross-sectional view of the insert-holding means in operative association with a multi-cavity mold.

The insert-holding means 10, and more particularly the plate 12 thereof, is supported for horizontal displacement in a pair (only one is shown) of horizontally slotted tracks or rails 42. In one position of the insert-holding means 10, the latter is opposite the insert-storage means 11 as illustrated in FIG. 1, and in a second position of the insert-holding means 10, the latter is opposite a multi-cavity mold 44 as illustrated in FIG. 3. Thus, the insert-holding means 10 is movable horizontally relative to the slotted rails 42 from the insert-storage means 11 to the mold 44 for loading the cavities of the latter simultaneously with respective inserts as will be described below.

The insert storage means 11 includes a multi-apertured plate 46 in which is formed an array of receptacles 48 spaced relative to one another and corresponding in size to the size and spaced apart relationship of the fingers 14 with one another. In each of the receptacles 48, there is a respective replenishable stack 50 (FIG. 1) of inserts 54 (FIG. 2) of generally annular configuration which are readily separable from one another for placement into the cavities of the mold 44. Depending upon when each stack 50 is replenished within its associated receptacle 48, the position P of the uppermost one of the inserts may vary from receptacle to receptacle or stack to stack.

The plate 46 rests upon, for example, a bed 52 associated with a power source (not shown) for effecting the elevation of the plate 46 (and thus the entire insert-storage means 11) upwardly from the position illustrated in FIG. 1 in the direction of arrow A to an elevation with respect to each of the fingers 14 at which the latter penetrate corresponding ones of the receptacles 48 sufficiently to allow each of the springs 16 to "grasp" a respective uppermost one of the inserts of each stack 50.

Figure 2:
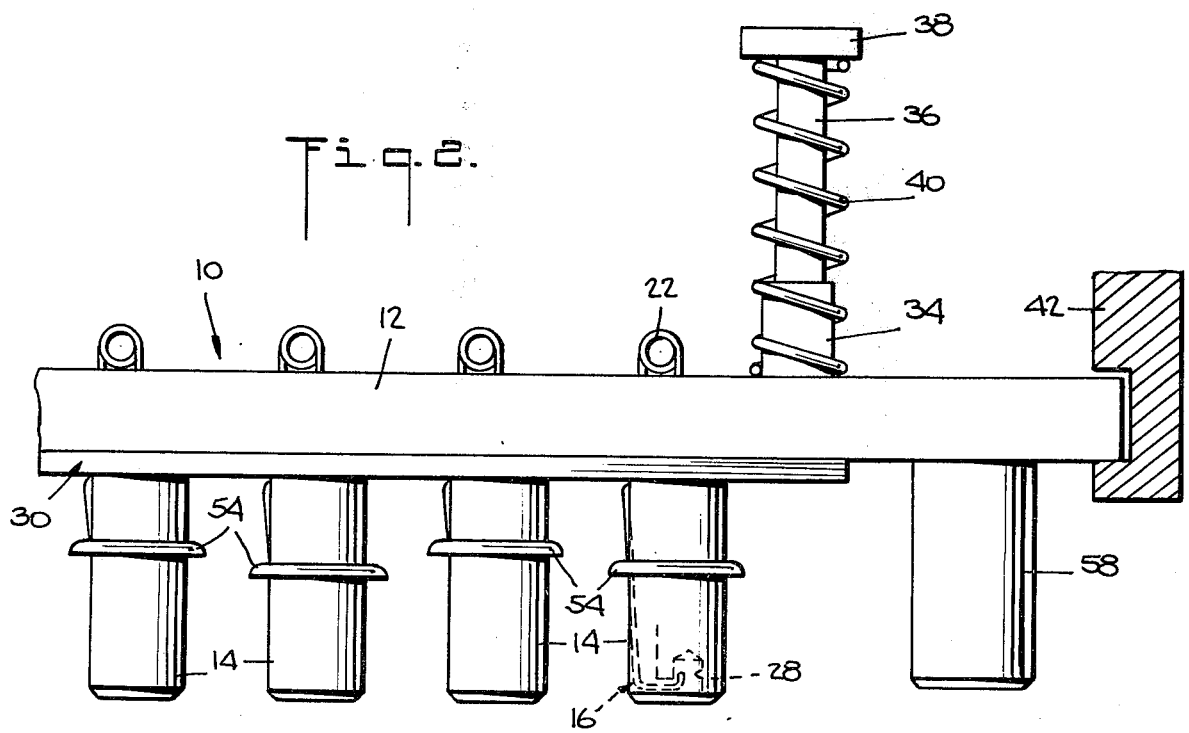
FIG. 2 is a fragmentary, frontal view of the insert-holding means of the present invention in a condition of holding a plurality of inserts upon the respective fingers thereof.

Each finger 14 penetrates its associated receptacle 48, upon the elevation of the plate 46, over the same extent that the other fingers 14 so penetrate their corresponding receptacles 48. However, the uppermost one of each of the inserts of each stack 50 will be held at position upon its associated finger 14 which varies relative to the other such inserts on the other fingers 14 as a function of the position P of each such insert on its corresponding stack 50. Accordingly, the position of each such insert 54 upon its corresponding finger 14 when withdrawn from its corresponding receptacle 48 is as illustrated in FIG. 2.

In operation, upon the elevation of the insert-storage means 11 relative to the insert-holding means 10, the fingers 14 penetrate corresponding ones of the stacks 50. Upon the initial penetration of each finger 14 of its corresponding stack 50, the corresponding spring 16 thereof is caused to engage the interior of the uppermost one of the inserts 54. Since each limb 20 of each spring 16 is biased outwardly of its corresponding slot 15, the lower region of each limb 20 acts to frictionally grasp a corresponding one of inserts 54 from the interior thereof and hold same upon its corresponding finger 14 in a manner illustrated in FIG. 2.

The insert-storage means 11 is then retracted so that the fingers 14 are entirely out of their corresponding receptacles 48, but retain thereon, respectively, the uppermost one of the inserts 54 of each stack 50. The insert-holding means 10 is now in a condition for movement horizontally away from the insert-storage means 11 to a subsequent position opposite the multi-cavity mold 44 illustrated in FIG. 3.

As illustrated in FIG. 3, the mold 44 is provided with a plurality of mold cavities 56 into which are insertable, respectively, the inserts 54. Once the insert-holding means 10 is opposite the mold 44, each of the handle-like members 38 may be depressed in the direction of arrow B to effect the downward displacement of the insert-stripping means or plate 30 relative to each of the fingers 14. As the plate 30 descends, it cams the bent region 24 of each of the springs 16 inwardly of its corresponding slot 15 to, thereby, release each of the inserts 54. The plate 30 is preferably displaced until it is just above the mold 44 to insure that each of the inserts 54 is pushed and entirely released from its corresponding finger 14 so that it might effectively drop into its proper position within the confines of its corresponding mold cavity 56.

Although not illustrated in the drawings, the plate 30 may be provided with short tubular members secured to the underside thereof in concentric relation with each of the apertures 35 thereof through which slidably project the fingers 14, respectively. The axial extent of each of such tubular members would preferably correspond to the axial extent of that lower portion of each of the fingers 14 which projects into the cavities 56. Such tubular members would, thereby, further insure that the inserts 54 would be pushed free and fully released from the aforementioned lower portion of each of the fingers 14 which projects into the cavities 56 so that such lower portions need not be excessively tapered to an extent which may otherwise interfere with the proper deposit of each of the inserts 54 into alignment with its respective mold cavity 56.

Further with respect to "alignment," the insert-holding means 10 is provided with a plurality (only one is shown) of reference projections 58 (FIG. 1) which are insertable into corresponding reference receptacles 60 formed in the insert-storage means 11 to insure that the fingers 14 are co-axially aligned with the receptacles 48. This relationship oversees the more specific need to center the axis of each of the fingers 14 with its corresponding insert stack 50.

Similarly, as illustrated in FIG. 3, the mold 44 is provided with a plurality of stub-like lugs 62 which are co-axially aligned with corresponding ones of the reference projections 58 of the insert-holding means 10, which projections 58 are provided with respective recessed end portions 64 for receiving corresponding ones of the stub-like lugs 62. As a result, during the deposit of each of the inserts 54 into its corresponding cavity 56, there is insured that the fingers 14 are co-axially aligned with the cavities 56 to insure the proper alignment of the inserts 54 in their corresponding cavities 56.

It has been determined that the lower region of each of the limbs 20 of the springs 16 should preferably form an angle $\alpha$ with the exterior of its corresponding finger 14 (FIG. 4) when the spring 16 is in its at-rest condition. The extent of the angle $\alpha$ should preferably be greater than the "arc tangent" of the value defined by a ratio in which the numerator is represented by the tolerance maintained in forming the internal diameter of each of the inserts 54, and wherein the denominator is represented by the thickness H of each of such inserts 54. The numerator or tolerance is defined, with more specificity, by the greatest difference in diameters between the largest acceptable internal diameter of a given insert 54 and the smallest acceptable internal diameter of a given insert 54.

Figure 4:
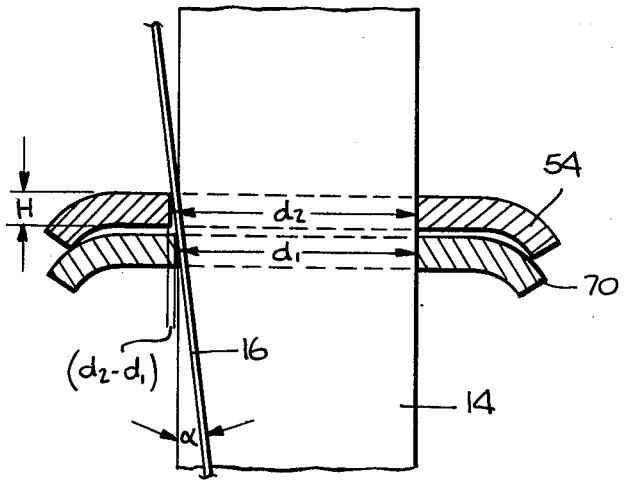
FIG. 4 is an enlarged, fragmentary view of one of the fingers and its association with the upper two inserts of a given insert stack.

For example, as illustrated in FIG. 4, an uppermost insert 54 may be provided with a diameter of maximum acceptable extent $d_2$, whereas the next insert 70 therebelow may be provided with the smallest acceptable internal diameter $d_1$. Accordingly, the angle would be defined by the following mathematical expression:

$$\alpha = \arctan \frac{d_2 - d_1}{H}$$

As a result, when the fingers 14 penetrate a given insert-stack 50, the angle of inclination of the lower region of each of the limbs 20 of the springs 16 is such that only the very uppermost one of the inserts 54 will be grasped by a corresponding spring 16, thereby leaving the very next insert 70 (just beneath the uppermost insert 54) upon each stack 50 for removal from the stacks 50 upon a subsequent (and only upon a subsequent) penetration of the stacks 50 by the fingers 14.

Moreover, even if the stacks 50 have different elevations relative to one another, only the uppermost one of the insert 54 will be removed in a given cycling of the insert-holding means 10 with the insert-storage means 11. Thus, the stacks 50 can be replenished when convenient with the safeguard that only the uppermost one of the inserts 54 will be withdrawn in any given cycle.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Apparatus for inserting a plurality of molding inserts into respective mold cavities simultaneously, said appartus comprising: insert-holding means for removably holding a plurality of generally annular inserts in spaced apart relation corresponding to the relative spacing of a plurality of cavities of a multi-cavity mold, said insert-holding means including resilient projection means for frictionally securing respective ones of said annular inserts from the interior thereof; and insert-stripping means operatively associated with said projection means and inserts for stripping the latter simultaneously from their associated projection means to effect the simultaneous insertion of said inserts into respective mold cavities of the multi cavity-mold, each of said projection means including a respective spring means for resiliently engaging the interior of an associated one of said inserts, each of said projection means including a respective slotted finger in which is movable a respective one of said spring means generally laterally of the direction said inserts are stripped therefrom and from which the latter said spring means extends at least in part to engage the interior of a respective one of said inserts.

2. Apparatus as claimed in claim 1, wherein each of said spring means includes a generally U-shaped upper region, the limbs of the latter region being joined by a generally spiral transition region to permit said limbs to be flexed relative to one another, one of said limbs being affixed to a respective one of said slotted fingers, the other of said limbs having a longer extent than the affixed limb and extending lengthwise in and along the slot of its associated finger for lateral movement in the latter said slot, said other of said limbs having a bent region extending slightly laterally out of the latter said slot for engaging the interior of a respective one of said inserts.

3. Apparatus as claimed in claim 2, wherein said other of said limbs terminates in a generally hook-shaped region, each of said slotted fingers including a recessed portion communicating with its respective slot and being operatively associated with a corresponding one of said hook-shaped regions to limit the amount of movement of a corresponding one of said other of said limbs outwardly of its respective slot.

4. Apparatus for inserting a plurality of molding inserts into respective mold cavities simultaneously, said apparatus comprising: insert-holding means for removably holding a plurality of generally annular inserts in spaced apart relation corresponding to the relative spacing of a plurality of cavities of a multi-cavity mold, said insert-holding means including resilient projection means for frictionally securing respective ones of said annular inserts from the interior thereof; insert-stripping means operatively associated with said projection means and inserts for stripping the latter simultaneously from their associated projection means to effect the simultaneous insertion of said inserts into respective mold cavities of the multi cavity-mold, said insert-stripping means including a multi-apertured plate having apertures through which project respective ones of said projection means; and control means for moving said plate relative to and along said projection means to strip from the latter simultaneously said inserts.

5. Apparatus as claimed in claim 4, wherein said control means includes at least one rod extending loosely through said insert-holding means and terminating in an accessible handle, and a helical spring having one end engaging one side of said insert-holding means and an opposite end engaging said handle to resiliently retain said multi-apertured plate against the other side of said insert-holding means from which project said projection means.

6. Apparatus as claimed in claim 5, wherein said apertures of said plate are dimensioned to squeeze each of said resilient projection means and, thereby, release from the latter said inserts.

7. Apparatus as claimed in claim 4, including insert-storage means for removably storing accessibly to said projection means a plurality of insert-stacks in a spaced apart array corresponding to the relative spacing of said projection means.

8. Apparatus as claimed in claim 7, including support means for supporting said insert-holding means for movement from a first position opposite said insert-storage means to a second position opposite a multi-cavity mold.

9. Apparatus as claimed in claim 4, including position-referencing means operatively associated with said insert-holding means and a multi-cavity mold for aligning said projection means with respective ones of the mold cavities.

10. Apparatus as claimed in claim 7, including position-referencing means operatively associated with said insert-holding means and said insert-storage means for aligning said projection means with respective ones of said insert-stacks.

* * * * *